United States Patent
Matthews et al.

(10) Patent No.: US 7,802,096 B1
(45) Date of Patent: Sep. 21, 2010

(54) FALLBACK KEY RETRIEVAL

(75) Inventors: Brian L. Matthews, Kent, WA (US); Scott Olechowski, Monte Sereno, CA (US); Cayce M. Ullman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 10/969,324

(22) Filed: Oct. 19, 2004

(51) Int. Cl.
*H04L 29/06* (2006.01)

(52) U.S. Cl. .................................. 713/165; 380/45

(58) Field of Classification Search ........... 713/165; 380/45
See application file for complete search history.

(56) References Cited

U.S. PATENT DOCUMENTS

| | | | |
|---|---|---|---|
| 4,218,738 A * | 8/1980 | Matyas et al. ............ 705/72 |
| 5,276,735 A * | 1/1994 | Boebert et al. ........... 713/167 |
| 5,495,533 A * | 2/1996 | Linehan et al. .......... 713/155 |
| 5,787,169 A * | 7/1998 | Eldridge et al. .......... 713/165 |
| 5,838,790 A * | 11/1998 | McAuliffe et al. ....... 713/176 |
| 6,119,227 A | 9/2000 | Mao |
| 6,249,866 B1 * | 6/2001 | Brundrett et al. ........ 713/165 |
| 6,249,886 B1 | 6/2001 | Kalkunte |
| 6,263,348 B1 * | 7/2001 | Kathrow et al. ......... 707/203 |
| 6,345,256 B1 * | 2/2002 | Milsted et al. ........... 705/1 |
| 6,496,847 B1 * | 12/2002 | Bugnion et al. ......... 718/1 |
| 6,911,974 B2 * | 6/2005 | Asano et al. ............ 345/204 |
| 6,912,634 B2 * | 6/2005 | Ripley et al. ........... 711/164 |
| 6,947,556 B1 * | 9/2005 | Matyas et al. .......... 380/29 |
| 6,983,365 B1 * | 1/2006 | Douceur et al. ......... 713/165 |
| 7,043,637 B2 * | 5/2006 | Bolosky et al. ......... 713/171 |
| 7,110,982 B2 * | 9/2006 | Feldman et al. ........ 705/51 |
| 7,272,231 B2 * | 9/2007 | Jonas et al. ............ 380/281 |
| 7,277,998 B1 * | 10/2007 | Agesen et al. .......... 711/163 |
| 7,280,956 B2 * | 10/2007 | Cross et al. ............. 713/171 |
| 7,343,493 B2 * | 3/2008 | Challener et al. ....... 713/193 |
| 7,590,868 B2 * | 9/2009 | Musa et al. ............ 713/193 |
| 2002/0106086 A1 * | 8/2002 | Kamiya et al. ......... 380/277 |
| 2002/0178271 A1 | 11/2002 | Graham et al. |

* cited by examiner

*Primary Examiner*—Edan Orgad
*Assistant Examiner*—James Turchen
(74) *Attorney, Agent, or Firm*—Hickman Palermo Truong & Becker LLP

(57) ABSTRACT

An apparatus, method, and computer-readable media capable of encrypting and decrypting secure documents with multiple passwords and/or fallback keys. Embodiments allow documents to decrypt themselves or be able to be decrypted with multiple passwords. Methods embodiments include the creation of self-encrypted documents that provide for multiple password decryption, and may include the automatic generation of at least one fallback key to facilitate decryption of documents.

68 Claims, 8 Drawing Sheets

FALLBACK KEY RETRIEVAL

RELATED APPLICATIONS

This application is related to the application filed concurrently herewith entitled Multiple Password Documents Ser. No. 10/969,220.

BACKGROUND

1. Field of the Invention

Aspects of the present invention relate in general to an apparatus, system and method of generating a fallback key for a password-protected document. Further aspects of the present invention include an apparatus, method, and computer-readable medium capable of decrypting a document with multiple passwords, and a fallback key.

2. Background of the Invention

With so much of a user's information stored digitally and protected by passwords, a user may forget or misplace a password. When the protected information is stored on one or more central servers, forgetting a password may simply result in contacting a customer service agent or web site to reset the password. However, when the password is protecting an encrypted document, resetting the password is not sufficient, as the encrypted document will still be encrypted with the old (forgotten) password.

DETAILED DESCRIPTION

What is needed is an apparatus, method, and computer-readable medium capable of decrypting a document with multiple passwords and/or fallback keys.

Aspects of the present invention include an apparatus, method, and computer-readable media capable of encrypting and decrypting secure documents with multiple passwords and/or fallback keys. One aspect of the invention is allowing documents to decrypt themselves or be able to be decrypted with multiple passwords. Another aspect of the invention is the automatic generation of at least one fallback key to facilitate decryption of documents.

For the purposes of this application, "documents" are any electronic files known in the art.

Embodiments of the present invention include an apparatus, method and computer-readable media that enable encryption and decryption of secure documents with multiple passwords and/or fallback keys. Method embodiments include the creation of self-encrypted documents that provide for multiple password decryption. Yet in other method embodiments, some embodiments may allow for the automatic generation of "fallback keys," which allow the decryption of the document.

Figure 1:
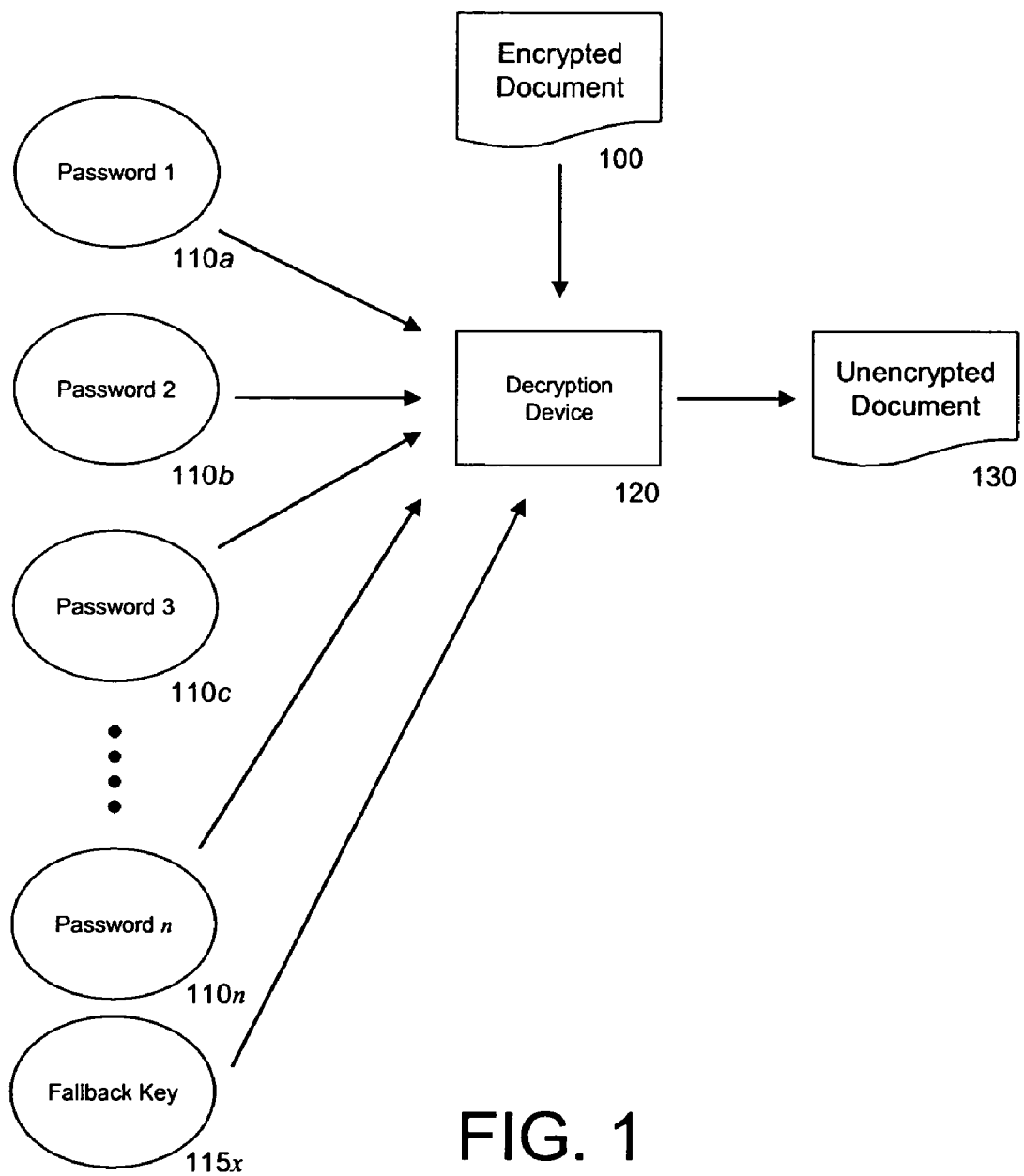
FIG. 1 illustrates an embodiment of a system where an encrypted document may be decrypted by entering one of many passwords or fallback keys into a decryption device.

FIG. 1 illustrates an embodiment of a system 10 where an encrypted document may be unencrypted by entering one of many passwords or fallback keys into a decryption device, constructed and operative in accordance with an embodiment of the present invention. As shown in this illustration, a decryption device 120 is able to generate an unencrypted document 130 from an encrypted document 100 and at least one of any number of passwords 110$a$-$n$ and/or fallback keys 115$x$.

Figure 2:
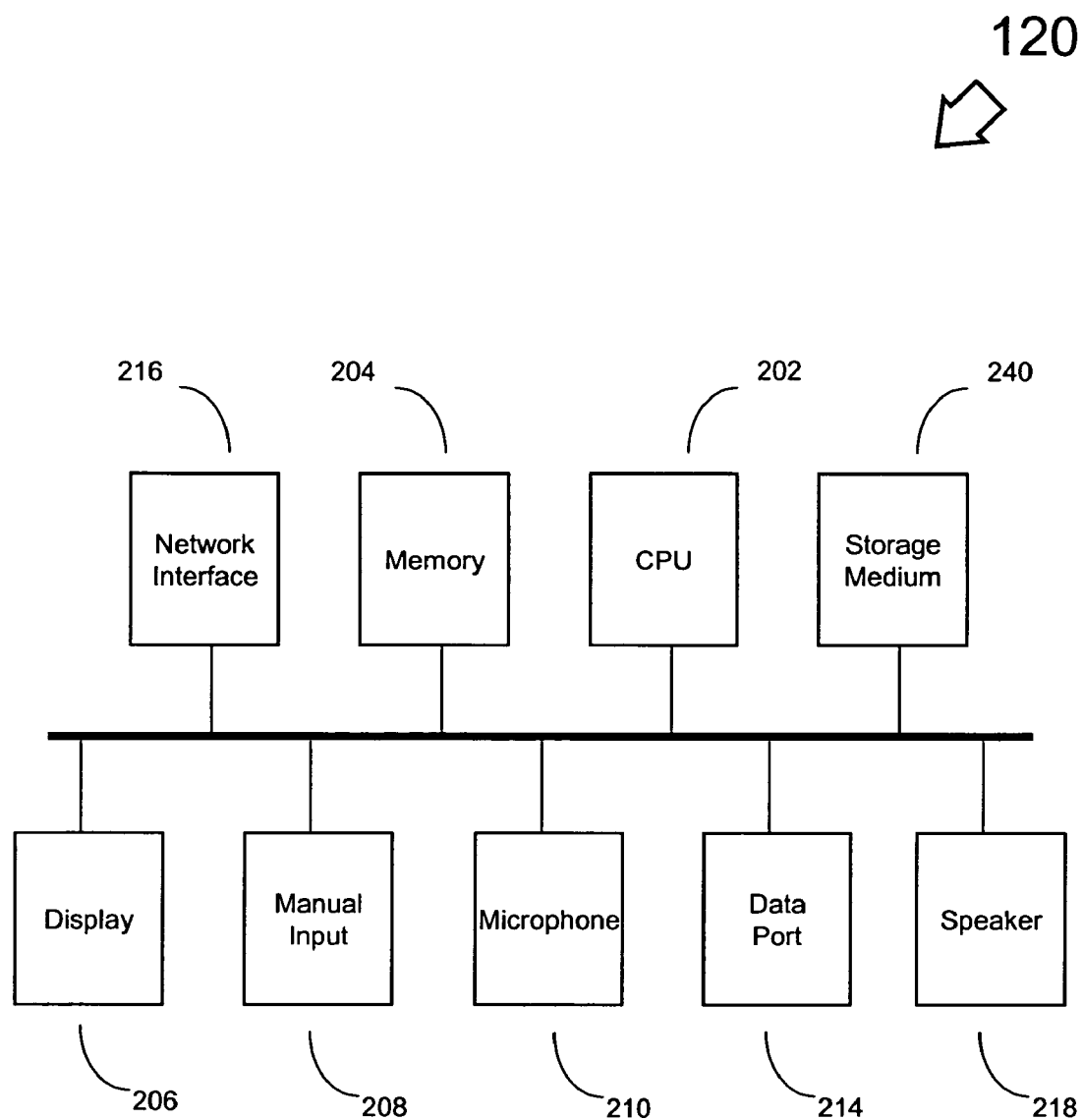
FIG. 2 is a block diagram of an apparatus that receives multiple passwords or fallback keys to decrypt an encrypted document.

Embodiments will now be disclosed with reference to a functional act diagram of an exemplary decryption device 120 of FIG. 2, constructed and operative in accordance with an embodiment of the present invention. Decryption device 120 may run a real-time multi-tasking operating system (OS) and include at least one processor or central processing unit (CPU) 202. Processor 202 may be any microprocessor or micro-controller as is known in the art.

The software for programming the processor 202 may be found at a computer-readable storage medium 240 or, alternatively, from another location across network 110. Processor 202 is connected to computer memory 204. Decryption device 120 may be controlled by an operating system that is executed within computer memory 204.

Processor 202 communicates with a plurality of peripheral equipment, including network interface 216. Additional peripheral equipment may include a display 206, manual input device 208, storage medium 240, microphone 210, and data port 214.

Display 206 may be a visual display such as a cathode ray tube (CRT) monitor, a liquid crystal display (LCD) screen, flat-panel display, touch-sensitive screen, or other monitors as are known in the art for visually displaying images and text to a user.

Manual input device 208 may be a conventional keyboard, keypad, mouse, trackball, joystick, light pen, areas of a touch-sensitive screen or other input device as is known in the art for the manual input of data.

Storage medium 240 may be a conventional read/write memory such as a magnetic disk drive, floppy disk drive, compact-disk read-only-memory (CD-ROM) drive, digital versatile disk (DVD) drive, flash memory, memory stick, transistor-based memory or other computer-readable memory device as is known in the art for storing and retrieving data. Significantly, storage medium 240 may be remotely located from processor 202, and be connected to processor 202 via a network 110 such as a local area network (LAN), a wide area network (WAN), or the Internet.

Microphone 210 may be any suitable microphone as is known in the art for providing audio signals to processor 202. In addition, a speaker 218 may be attached for reproducing audio signals from processor 202. Video input 122 may be a digital or analog video camera device to record still or moving images. It is understood that microphone 210, speaker 218, and data port 214 may include appropriate digital-to-analog and analog-to-digital conversion circuitry as appropriate.

Data port 214 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 214 may be any interface as known in the art for communicating or transferring files across a computer network, examples of such networks include Transmission Control Protocol/Internet Protocol (TCP/IP), Ethernet, Fiber Distributed Data Interface (FDDI), token bus, or token ring networks. In addition, on some systems, data port 214 may consist of a modem connected to network interface 216. Similarly, in some embodiments network interface 216 provides connectivity to decryption device 120 to communicate with a network 110. Thus, the network interface 216 allows the decryption device 120 to communicate and process input and output from across a network.

Figure 3:
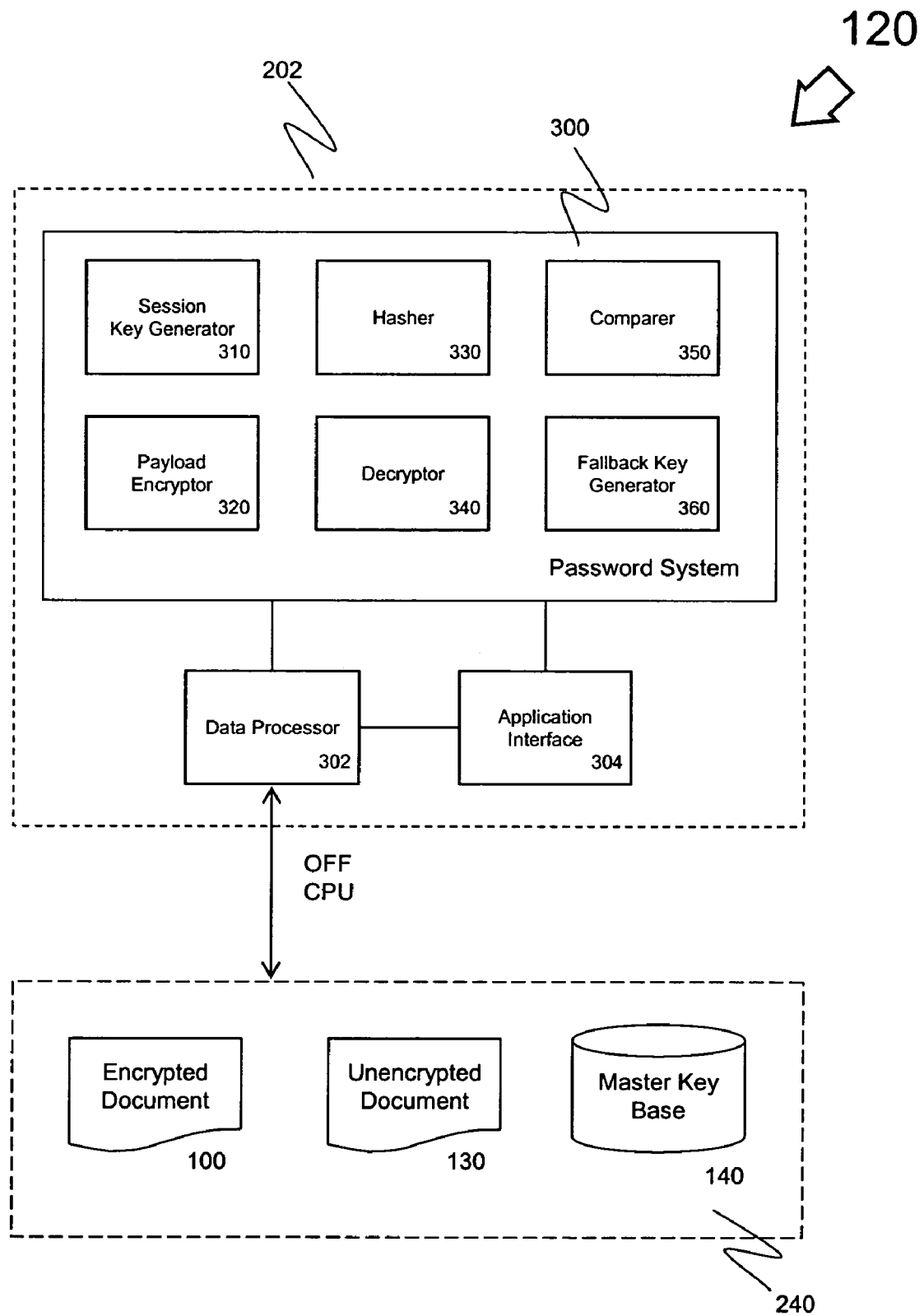
FIG. 3 is a block diagram of an apparatus that receives multiple passwords or fallback keys to decrypt an encrypted document.

FIG. 3 is an expanded functional act diagram of CPU 202 and storage medium 240, constructed and operative in accordance with an embodiment of the present invention. It is well understood by those in the art, that the functional elements of FIG. 3 may be implemented in hardware, firmware, or as software instructions and data encoded on a computer-readable storage medium 240. As shown in FIG. 3, central processing unit 202 is functionally comprised of a password system 300, data processor 302, and an application interface 304. Password system 300 may further comprise: session key generator 310, payload encryptor 320, hasher 330, decryptor 340, comparer 350, and fallback key generator 360. These structures may be implemented as hardware, firmware, or software encoded on computer readable medium 240. In addition, as shown in FIG. 3, storage media 240 may also contain encrypted document 100, unencrypted document 130, and a master key base 140. The function of these structures may best be understood with respect to the flowchart of FIGS. 4-8, as described below.

Data processor 302 interfaces with display 206, manual input device 208, storage medium 240, microphone 210, data port 214, and network interface 216. The data processor 302 enables processor 202 to locate data on, read data from, and write data to, these components.

Application interface 304 enables processor 202 to take some action with respect to a separate software application or entity. For example, application interface 304 may take the form of a windowing call recipient interface, as is commonly known in the art.

Password system 300 may be a window-interfaced encryption/decryption system. In some embodiments, the password system 300 may be stand-alone program, or a subset of a web-browser window or browser plug-in.

Figure 4:
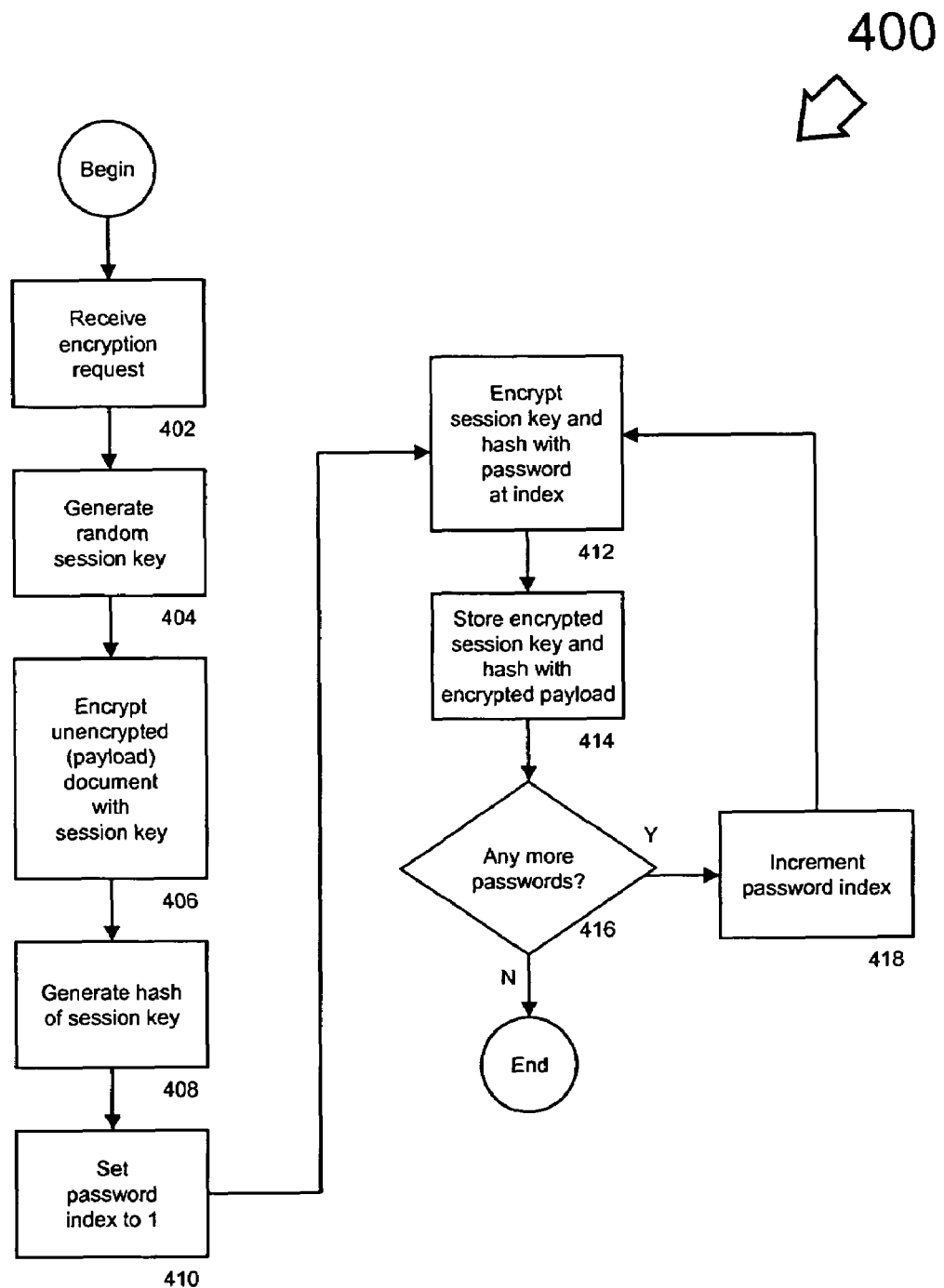
FIG. 4 is a flow chart of a method to encrypt a document with multiple passwords.

FIG. 4 flowcharts process 400, a method of encrypting a document with multiple passwords, constructed and operative in accordance with an embodiment of the present invention.

At act 402, process 400 receives a request to encrypt an unencrypted document 130. Session key generator 310 generates a random session key, act 404. Any random key generation algorithm known in the art may be used. In theory, it does not matter how the random session key is generated, and a variety of different random key generator algorithms may be used depending upon the system design tradeoffs made. For example, in a Java embodiment, Java's Random, which is a standard linear congruent method, or a Java SecureRandom ("SHA1PRNG") instance, which generates repeated SHA-1 hashes of a seed, may be used. The former algorithm is faster, although the latter is more secure.

Payload encryptor 320 encrypts the unencrypted document 130, producing an encrypted payload at act 406. Payload encryptor 320 may use a variety of encryption algorithms, including, but not limited to: ARC4, AES, RSA, 3DES, DSA, Skipjack, Blowfish, Two-Fish, or any other encryption algorithm known in the art.

At act 408, hasher 330 hashes the session key. Any hashing algorithm may be used, including, but not limited to: SHA1, MD5, or any other hashing algorithm known in the art.

A password index is set to 1, at act 410; the payload encryptor encrypts the session key and hash with the password, inserting the result at the document index at act 412. Each password is used to encrypt the session key, hash combination. The algorithm used to perform the encryption may be the same as or different from the algorithm used to encrypt the payload. The encrypted session keys and encrypted payload are combined, at act 414, and if more passwords exist, as determined by decision act 416, the password index is incremented, at act 418, and flow returns to act 412. Otherwise, if there are no more passwords, as determined by decision act 416, process 400 ends.

Figure 5:
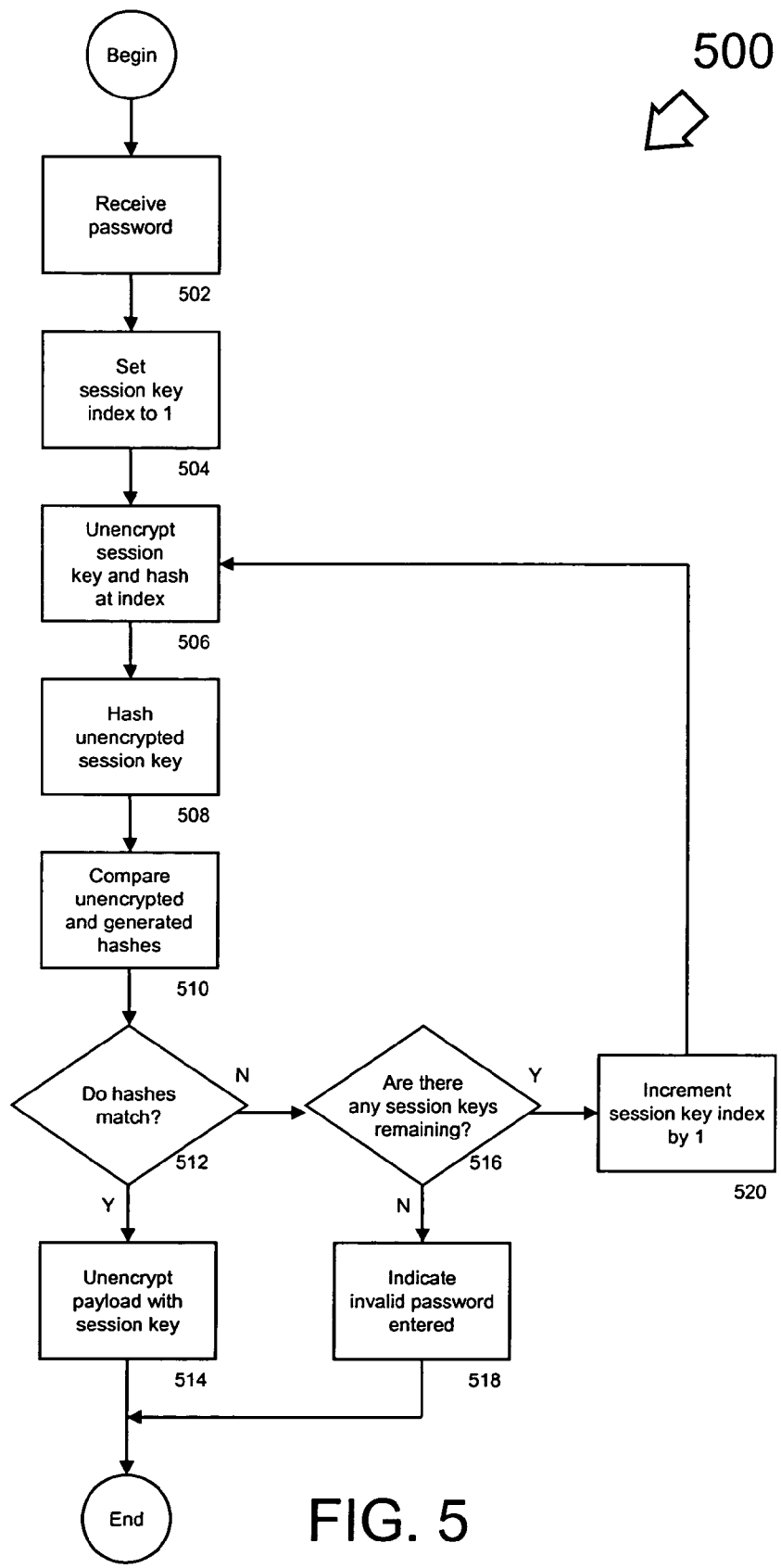
FIG. 5 is a flow chart of a method of decrypting an encrypted document with multiple passwords.

FIG. 5 is a flow chart of process 500, a method of unencrypting an encrypted document associated with multiple passwords, constructed and operative in accordance with an embodiment of the present invention.

Initially, at act 502, process 500 receives a password. The password may be received from a user, program, or other agent. The session key index is set to 1, act 504, and the decryptor 340 unecrypts each encrypted session key and hash in turn with the password 110, act 506. The unencryption algorithm used to perform the decryption must be the same one used to perform the encryption, as discussed above, however the implementation may be the same or different.

As the decryptor decrypts each session key, hasher 330 generates a hash of the decrypted session key, act 508, and comparer 350 compares the result with the hash contained with the session key, act 510. The hash algorithm used must be the same algorithm used during encryption, however again the implementation may or may not differ.

If a hash matches, as determine at act 512, the user has entered a valid password, and the decrypted session key is used to decrypt the encrypted payload, using the same algorithm used to encrypt the payload, act 514. Otherwise, act 516 determines whether there are any remaining session keys 516. If no session keys remain, process 500 indicates an invalid password has been entered, act 518. If session keys remain, process 500 the session key index is incremented by 1, act 520, and flow returns to act 506.

In addition to supporting multiple passwords 110*a-n*, embodiments may support any number of fallback keys 115. With so much of a user's information stored digitally and protected by passwords, a user may forget or misplace a password. When the protected information is stored on one or more central servers, forgetting a user account password may simply result in contacting a customer service agent or web site to reset the account password. However, when the password 110 is protecting an encrypted document 100, resetting a user account password is not sufficient, as the encrypted document will still be encrypted with the forgotten (document) password 110.

One way to ensure that an encrypted document remains accessible is to encrypt the document with multiple passwords, as described above. Alternatively, a document may be encrypted with one or more passwords 110*a-n*, and one or more fallback keys 115*x*. In some embodiments, a fallback key 115 would be obtained by contacting a customer service agent or web site. The fallback key 115 may be a simple word or phrase, or it may be a value generated from one or more unique characteristics of the encrypted document.

Figure 6:
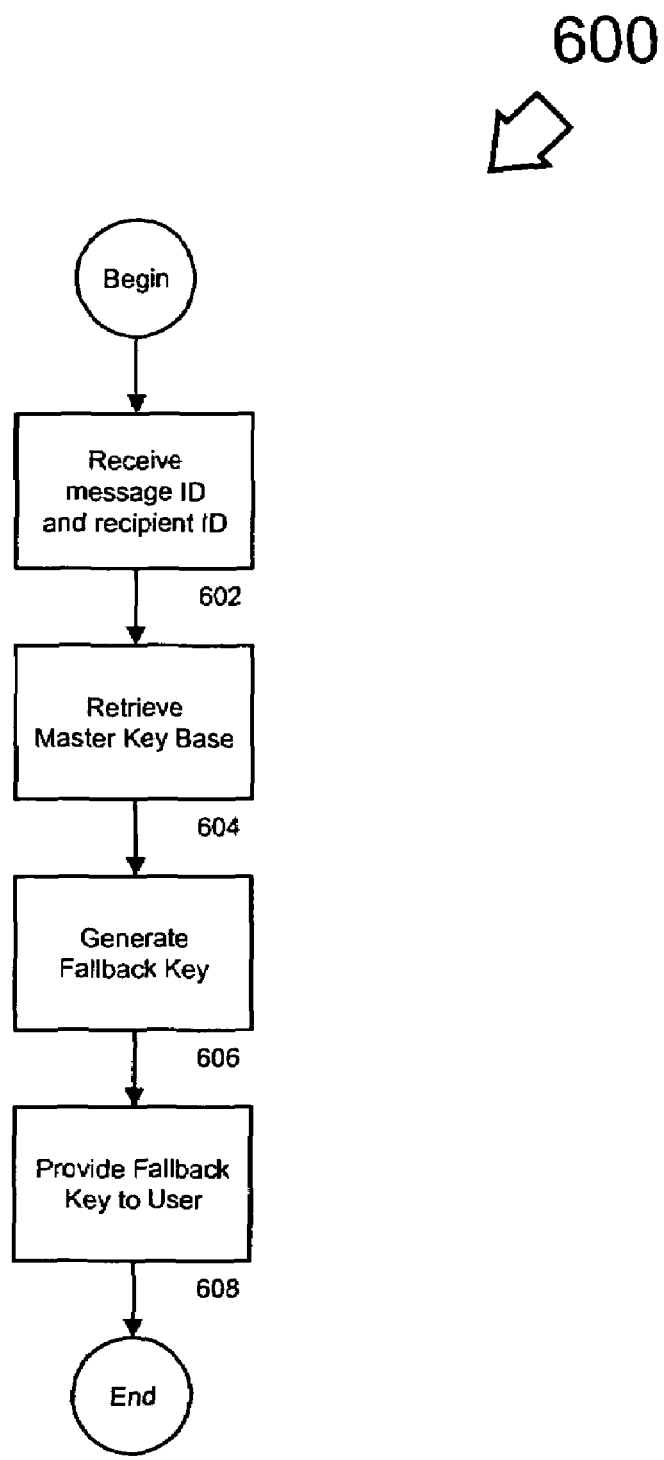
FIG. 6 is a flow chart of a method of providing a fallback key to a user.

FIG. 6 is a flow chart of a process 600 of providing a fallback key 115 to a user, constructed and operative in accordance with an embodiment of the present invention. Fallback keys 115 are any passwords or unencryption keys that may be generated to facilitate the unencryption of a document, in accordance with an embodiment of the present invention.

Upon forgetting the password for an encrypted document, the user visits a web site or contacts a customer service representative. In embodiments where a predetermined fallback key 115 exists, the fallback key is provided to the user, act 608. However, in more secure embodiments of the present invention, fallback keys 115 may be associated with one or more characteristics of the encrypted document 100, such as a message identifier and recipient identifier associated with the encrypted document; process 600 receives selected characteristics at act 602. It is understood, by those known in the art, that other document characteristics may be used, including, but not limited to: recipient identifier, message identifier, document file size, document type, document author, document editor name, document creator, document creation date, document save date, client or matter number, client name, matter name, and/or any other characteristic known in the art.

In such an embodiment, the web site or program being used by the customer service representative has been configured with a master key base, which is retrieved by process 600, act 604. This master key base 140 is combined with the message identifier and recipient identifier, for example by encrypting the message identifier and recipient identifier using the master key base 140 as the key, to produce the fallback key 115, act 606, which is detailed in greater depth below. The fallback key 115 is provided to the user, act 608. The user may then enter the fallback key 115 as to decrypt the document.

The password system 300 attempts to decrypt each encrypted session key stored in the encrypted document in turn. When an encrypted session key can be decrypted, that session key is used to decrypt the remainder of the encrypted document 100.

Figure 7:
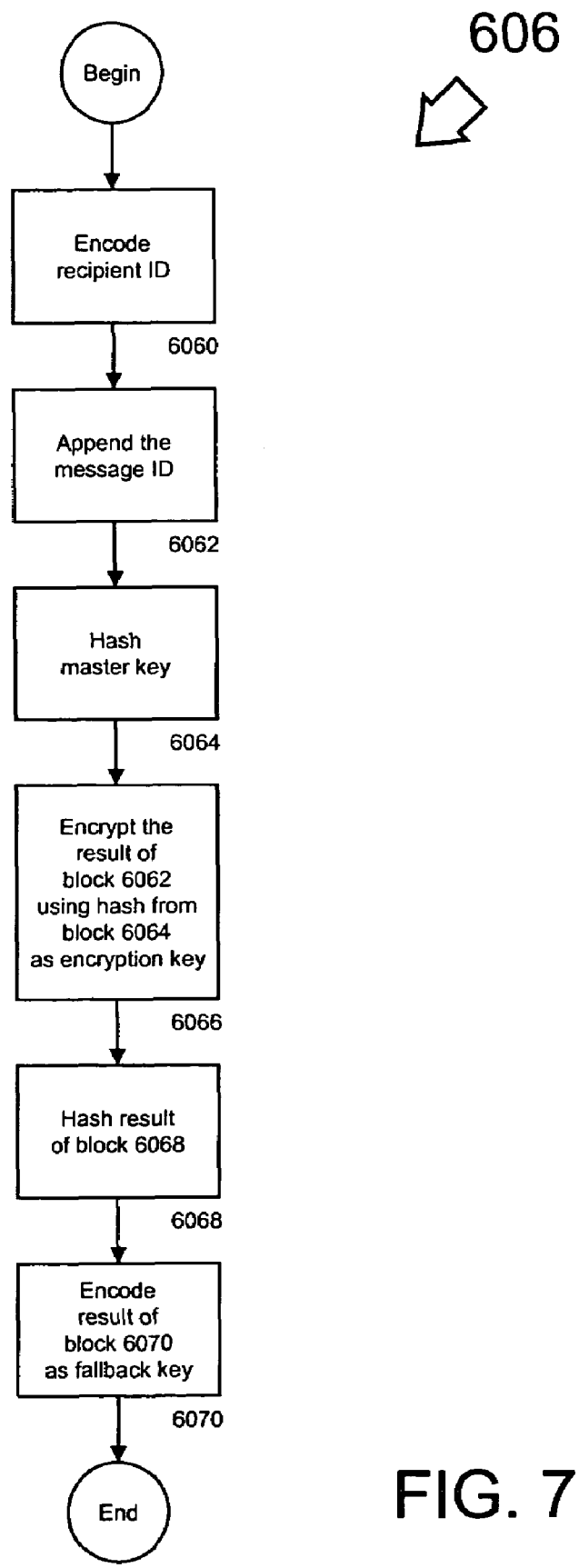
FIG. 7 is a flow chart of a method of generating a fallback key.

FIG. 7 is a flow chart of a method 606 of generating a fallback key, constructed and operative in accordance with an embodiment of the present invention. Process 606 illustrates the acts performed by fallback key generator 360. In this embodiment, shown for illustrative purposes only, a recipient ID and message ID are used as document characteristics for the generation of a fallback key. It understood, by those known in the art, that other document characteristics may be used. A recipient ID may be any identifier that associates a document with a recipient, including, but not limited to: a name, an electronic mail address, customer number, or any other association known in the art. A message identifier may be any identifier known in the art that identifies a message, including, but not limited to: a title, a serial number, a MIME electronic-mail message identifier, or any other message identifier known in the art.

In addition, to recipient ID and message ID, method 606 may use a master key retrieved from a master key base 140. Such a master key may be any identifier known in the art. One aspect of the present invention is that the master key is kept secret from users so that unauthorized users cannot reverse-engineer a fallback keys.

Initially, at act 6060, the recipient identifier is encoded. Some embodiments encode the recipient identifier using a base 64 encoding. The result of the encoding is appended to the message identifier, act 6062. A master key is hashed at 6064. The hash is used as the key to encrypt the combined recipient and message identifiers, act 6066. The encryption algorithms used may be the same or different from the algorithms discussed above, including, but not limited to: ARC4, AES, RSA, 3DES, DSA, Skipjack, Blowfish, Two-Fish, or any other encryption algorithm known in the art. The encrypted result is hashed at act 6068. Once again, any hashing algorithm may be used, including, but not limited to: SHA1, MD5, or any other hashing algorithm known in the art. Finally, this last result is encoded at act 6070.

The algorithm encompassed by this method embodiment can be expressed as:

fallback key=Encode(Hash(Encrypt(Hash(Master Key), Encode(Recipient ID)+Message ID)))

It is understood by those known in the art that various modifications to the inventive concept of using and generating a fallback key with document characteristics will be readily apparent to those skilled in the art, and the generic principles defined by the above description may be applied to other embodiments without the use of inventive faculty.

Figure 8:
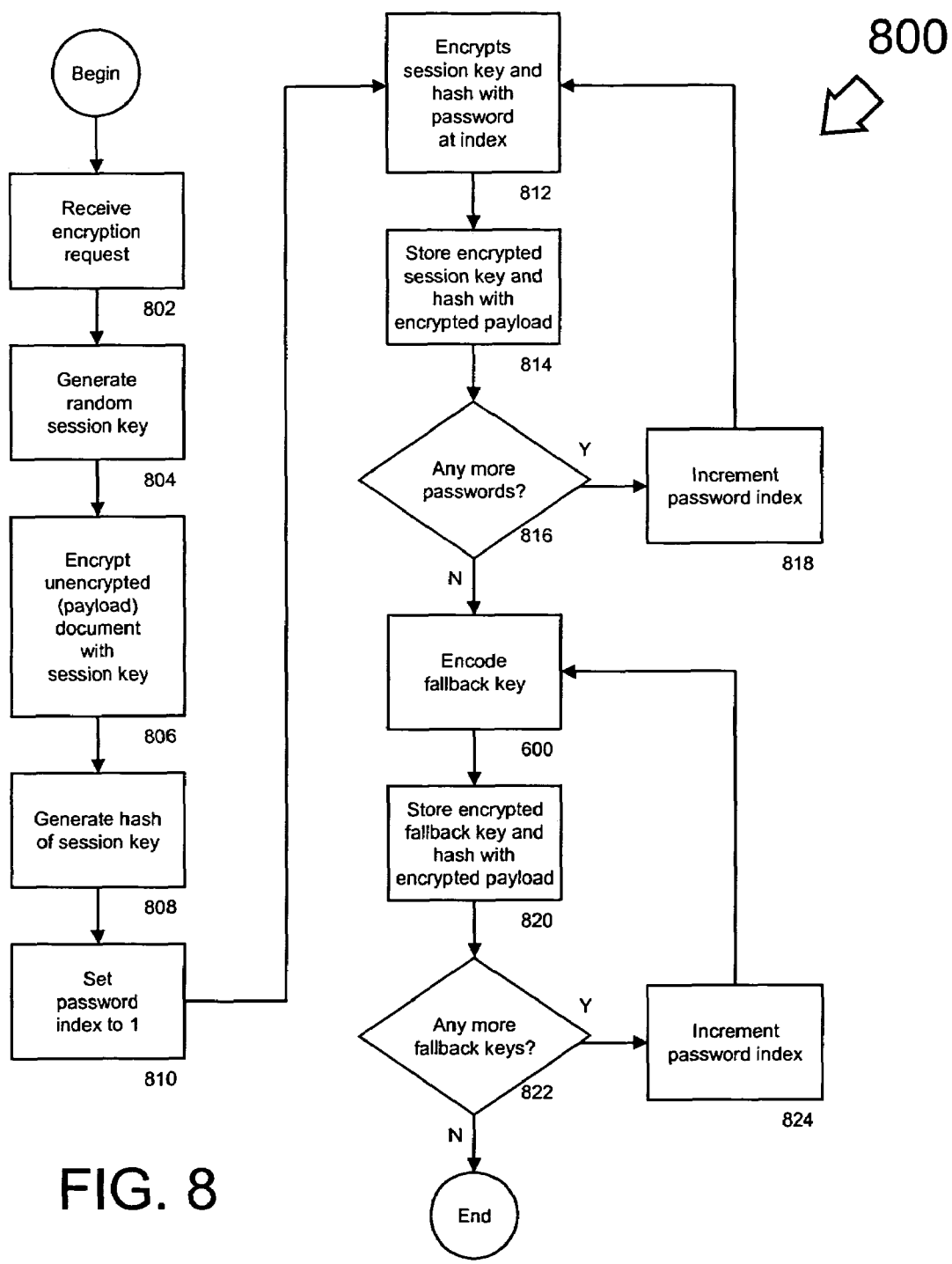
FIG. 8 is a flow chart of a method of encrypting a document with fallback keys.

FIG. 8 is a flow chart of a process 800 of unencrypting an encrypted document with fallback keys constructed and operative in accordance with an embodiment of the present invention. This embodiments facilitates unencryption of an encrypted document with one or more passwords and one or more fallback keys.

At act 802, process 800 receives a request to encrypt an unencrypted document 130. Process 800 generates a random session key at act 804. Any random key generation algorithm known in the art may be used. In theory, it does not matter how the random session key is generated, and a variety of different random key generator algorithms may be used depending upon the system design tradeoffs made. For example, in a Java embodiment, Java's Random, which is a standard linear congruent method, or a Java SecureRandom("SHA1PRNG") instance, which generates repeated SHA-1 hashes of a seed, may be used. As mentioned above, the former algorithm is faster, although the latter is more secure.

Process 800 encrypts the unencrypted document 130, producing an encrypted payload at act 806. Process 800 may use a variety of encryption algorithms, including, but not limited to: ARC4, AES, RSA, 3DES, DSA, Skipjack, Blowfish, Two-Fish, or any other encryption algorithm known in the art.

At act 808, process 800 hashes the session key. Any hashing algorithm may be used, including, but not limited to: SHA1, MD5, or any other hashing algorithm known in the art.

At act 810, a password index is set to 1; the payload encryptor encrypts the session key and hash with the password, inserting the result at the document index at act 812. Each password is used to encrypt the session key, hash combination. The algorithm used to perform the encryption may be the same as or different from the algorithm used to encrypt the payload. The encrypted session keys and encrypted payload are combined, at act 814, and if more passwords exist, as determined by decision act 816, the password index is incremented, at act 818, and flow returns to act 812.

When there are no more passwords, as determined by decision act 816, process 800 encodes a fallback key using process 600. It is understood, that in some embodiments, process 600 may be the process described in FIG. 6, or may more simply be a standard predefined text and/or numeric strings.

The fallback key 115 is encrypted and encrypted payload are combined, at act 820, and if more fallback key 115 exist, as determined by decision act 822, the password index is incremented, at act 824, and flow returns to act 600.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An apparatus to encrypt a payload, comprising:
a session key generator configured to generate a session key;
a hasher configured to generate a hash of the session key;
a fallback key generator configured to generate one or more fallback keys, each fallback key configured to enable decryption of the payload;
a payload encryptor configured to:
encrypt the payload using the session key, and store in a file the encrypted payload;
receive one or more user passwords, each user password configured to enable decryption of the payload;
for each of the one or more user passwords:
encrypt both the session key and the hash of the session key using the user password, and append to the file: the hash of the session key encrypted with the user password, and the session key encrypted with the user password;
for each of the one or more fallback keys:
encrypt both the session key and the hash of the session key using the fallback key, and append to the file: the hash of the session key encrypted with the fallback key, and the session key encrypted with the fallback key;
upon receiving an indication that a decryption of the payload, using the one or more user passwords, was unsuccessful, provide one of the one or more fallback keys.

2. The apparatus of 1 wherein the session key generator generates the session key randomly.

3. The apparatus of 2, wherein the payload encryptor is further configured to receive more than one password.

4. The apparatus of 3 wherein the payload encryptor is further configured to encrypt the hash of the session key for each password received.

5. The apparatus of 4 wherein the payload encryptor is further configured to store the encrypted hash of the session key for each password received.

6. The apparatus of 5 wherein the encryption of the payload with the session key uses: ARC4, AES, RSA, 3DES, DSA, Skipjack, Blowfish, or Two-Fish algorithms.

7. The apparatus of 5 wherein hashing the session key with a received password uses: SHA1 or MD5 algorithms.

8. The apparatus of 5 wherein the encryption of the hash of the session key uses: ARC4, AES, RSA, 3DES, DSA, Skipjack, Blowfish, or Two-Fish algorithms.

9. The apparatus of 5 wherein the encryption of the fallback key uses: ARC4, AES, RSA, 3DES, DSA, Skipjack, Blowfish, or Two-Fish algorithms.

10. The apparatus of 5, wherein the fallback key generator is further configured to encode a first document characteristic.

11. The apparatus of 10, wherein the fallback key generator is further configured to append a second document characteristic with the first document characteristic.

12. The apparatus of 11, wherein the hasher is further configured to hash a master key.

13. The apparatus of 12, wherein the payload encryptor is further configured to encrypt the appended characteristics with the hashed master key.

14. The apparatus of 13, wherein the hasher is further configured to hash the encrypted appended characteristics.

15. The apparatus of 13, wherein the payload encryptor is further configured to encode the hashed encrypted appended characteristics.

16. The apparatus of 15, wherein the first characteristic is: recipient identifier, message identifier, document file size, document type, document author, document editor name, document creator, document creation date, document save date, client or matter number, client name, or matter name.

17. The apparatus of 16, wherein the second characteristic is: recipient identifier, message identifier, document file size, document type, document author, document editor name, document creator, document creation date, document save date, client or matter number, client name, or matter name.

18. A method of encrypting a payload, comprising:
generating a session key;
encrypting the payload using the session key, and storing in a file the encrypted payload;
generating a hash of the session key;
receiving one or more user passwords, each user password configured to enable decryption of the payload;
for each of the one or more user passwords:
encrypting both the session key and the hash of the session key using the user password, and appending to the file: the hash of the session key encrypted with the received password and the session key encrypted with the received password;
generating one or more fallback keys, each fallback key configured to enable decryption of the payload;
for each of the one or more fallback keys:
encrypting both the session key and the hash of the session key using the fallback key; and appending to the file: the hash of the session key encrypted with the fallback key, and the session key encrypted with the fallback key;
upon receiving an indication that a decryption of the payload, using the one or more user passwords, was unsuccessful, providing one of the one or more fallback keys.

19. The method of 18 wherein the session key is generated randomly.

20. The method of 19 further comprising: receiving more than one password.

21. The method of 20 further comprising: encrypting the hash of the session key for each password received.

22. The method of 21 further comprising: storing the encrypted hash of the session key for each password received.

23. The method of 22 wherein the encryption of the payload with the session key uses: ARC4, AES, RSA, 3DES, DSA, Skipjack, Blowfish, or Two-Fish algorithms.

24. The method of 22 wherein hashing the session key with a received password uses: SHA1 or MD5 algorithms.

25. The method of 22 wherein the encryption of the hash of the session key uses: ARC4, AES, RSA, 3DES, DSA, Skipjack, Blowfish, or Two-Fish algorithms.

26. The method of 22 wherein the encryption of the fallback key uses: ARC4, AES, RSA, 3DES, DSA, Skipjack, Blowfish, or Two-Fish algorithms.

27. The method of 22, wherein generating the fallback key further comprises: encoding a first document characteristic.

28. The method of 27, wherein generating the fallback key further comprises: appending a second document characteristic with the first document characteristic.

29. The method of 28, wherein generating the fallback key further comprises: hashing a master key.

30. The method of 29, wherein generating the fallback key further comprises: encrypting the appended characteristics with the hashed master key.

31. The method of 30, wherein generating the fallback key further comprises: hashing the encrypted appended characteristics.

32. The method of 30, wherein generating the fallback key further comprises: encoding the hashed encrypted appended characteristics.

33. The method of 32, wherein the first characteristic is: recipient identifier, message identifier, document file size, document type, document author, document editor name, document creator, document creation date, document save date, client or matter number, client name, or matter name.

34. The method of 33, wherein the second characteristic is: recipient identifier, message identifier, document file size, document type, document author, document editor name, document creator, document creation date, document save date, client or matter number, client name, or matter name.

35. An apparatus to encrypt a payload, comprising:
one or more processors;
means for generating a session key;
means for encrypting the payload using the session key and storing in a file the encrypted payload;
means for generating a hash of the session key;
means for receiving one or more user passwords, each user password configured to enable decryption of the payload;
means for encrypting, for each of the one or more user passwords, both the session key and the hash of the session key using the user password, and appending to the file: the hash of the session key encrypted with the user password and the session key encrypted with the user password;
means for generating one or more fallback keys, each fallback key configured to enable decryption of the payload;
means for encrypting, for each of the one or more fallback keys, both the session key and the hash of the session key using the fallback key; and appending to the file: the hash of the session key encrypted with the fallback key, and the session key encrypted with the fallback key;
means for providing one of the one or more fallback keys upon receiving an indication that a decryption of the payload, using the one or more user passwords, was unsuccessful.

36. The apparatus of 35 wherein the session key generator generates the session key randomly.

37. The apparatus of 36 further comprising: means for receiving more than one password.

38. The apparatus of 37 further comprising: means for encrypting the hash of the session key for each password received.

39. The apparatus of 38 further comprising: means for storing the encrypted hash of the session key for each password received.

40. The apparatus of 39 wherein the means for encrypting the payload with the session key uses: ARC4, AES, RSA, 3DES, DSA, Skipjack, Blowfish, or Two-Fish algorithms.

41. The apparatus of 39 wherein the means for hashing the session key with a received password uses: SHA1 or MD5 algorithms.

42. The apparatus of 39 wherein the means for encrypting the hash of the session key uses: ARC4, AES, RSA, 3DES, DSA, Skipjack, Blowfish, or Two-Fish algorithms.

43. The apparatus of 39 wherein the means for encrypting the fallback key uses: ARC4, AES, RSA, 3DES, DSA, Skipjack, Blowfish, or Two-Fish algorithms.

44. The apparatus of 39, wherein means for generating the fallback key further comprises: means for encoding a first document characteristic.

45. The apparatus of 44, wherein the means for generating the fallback key further comprises: means for appending a second document characteristic with the first document characteristic.

46. The apparatus of 45, wherein the means for generating the fallback key further comprises: means for hashing a master key.

47. The apparatus of 46, wherein the means for generating the fallback key further comprises: means for encrypting the appended characteristics with the hashed master key.

48. The apparatus of 47, wherein the means for generating the fallback key further comprises: means for hashing the encrypted appended characteristics.

49. The apparatus of 47, wherein the means for generating the fallback key further comprises: means for encoding the hashed encrypted appended characteristics.

50. The apparatus of 49, wherein the first characteristic is: recipient identifier, message identifier, document file size, document type, document author, document editor name, document creator, document creation date, document save date, client number, matter number, client name, or matter name.

51. The apparatus of 50, wherein the second characteristic is: recipient identifier, message identifier, document file size, document type, document author, document editor name, document creator, document creation date, document save date, client number, matter number, client name, or matter name.

52. A computer-readable storage medium, encoded with data and instructions, such that when executed by a computer, the instructions causes the computer to:
generate a session key;
encrypt a payload using the session key and store in a file the encrypted payload;
generate a hash of the session key;
receive one or more user passwords, each user password configured to enable decryption of the payload;
for each of the one or more user passwords:
encrypt both the session key and the hash of the session key using the user password, and append to the file: the hash of the session key encrypted with the user password and the session key encrypted with the user password;
generate one or more fallback keys, each fallback key configured to enable decryption of the payload;
for each of the one or more fallback keys:
encrypt both the session key and the hash of the session key using the fallback key; and append to the file: the hash of the session key encrypted with the fallback key, and the session key encrypted with the fallback key,
upon receiving an indication that a decryption of the payload, using the one or more user passwords, was unsuccessful, provide one of the one or more fallback keys.

53. The computer-readable storage medium of 52 wherein the session key generator generates the session key randomly.

54. The computer-readable storage medium of 53 further comprising instructions to: receive more than one password.

55. The computer-readable storage medium of 54 further comprising instructions to: encrypt the hash of the session key for each password received.

56. The computer-readable storage medium of 55 further comprising instructions to: store the encrypted hash of the session key for each password received.

57. The computer-readable storage medium of 56 wherein the encryption of the payload with the session key uses: ARC4, AES, RSA, 3DES, DSA, Skipjack, Blowfish, or Two-Fish algorithms.

58. The computer-readable storage medium of 56 wherein hashing the session key with a received password uses: SHA1 or MD5 algorithms.

59. The computer-readable storage medium of 56 wherein the encryption of the hash of the session key uses: ARC4, AES, RSA, 3DES, DSA, Skipjack, Blowfish, or Two-Fish algorithms.

60. The computer-readable storage medium of 56 wherein the encryption of the fallback key uses: ARC4, AES, RSA, 3DES, DSA, Skipjack, Blowfish, or Two-Fish algorithms.

61. The computer-readable storage medium of 56, wherein instructions to generate the fallback key further comprise: encoding a first document characteristic.

62. The computer-readable storage medium of 61, wherein instructions to generate the fallback key further comprise: appending a second document characteristic with the first document characteristic.

63. The computer-readable storage medium of 62, wherein instructions to generate the fallback key further comprise: hashing a master key.

64. The computer-readable storage medium of 63, wherein instructions to generate the fallback key further comprise: encrypting the appended characteristics with the hashed master key.

65. The computer-readable storage medium of 64, wherein instructions to generate the fallback key further comprise: hashing the encrypted appended characteristics.

66. The computer-readable storage medium of 64, wherein instructions to generate the fallback key further comprise: encoding the hashed encrypted appended characteristics.

67. The computer-readable storage medium of 64, wherein the first characteristic is: recipient identifier, message identifier, document file size, document type, document author, document editor name, document creator, document creation date, document save date, client or matter number, client name, or matter name.

68. The computer-readable storage medium of 67, wherein the second characteristic is: recipient identifier, message identifier, document file size, document type, document author, document editor name, document creator, document creation date, document save date, client or matter number, client name, or matter name.

* * * * *

UNITED STATES PATENT AND TRADEMARK OFFICE
CERTIFICATE OF CORRECTION

PATENT NO. : 7,802,096 B1
APPLICATION NO. : 10/969324
DATED : September 21, 2010
INVENTOR(S) : Brian L. Matthews et al.

It is certified that error appears in the above-identified patent and that said Letters Patent is hereby corrected as shown below:

Column 10, Claim 52, Line 47, replace "," with --;--

Signed and Sealed this

Thirtieth Day of November, 2010

David J. Kappos
*Director of the United States Patent and Trademark Office*